(12) United States Patent
Luinaud et al.

(10) Patent No.: US 10,197,467 B2
(45) Date of Patent: Feb. 5, 2019

(54) MODULAR CALIBRATION ROTOR FOR A HORIZONTAL BALANCER

(71) Applicant: SAFRAN AIRCRAFT ENGINES, Paris (FR)

(72) Inventors: Alain Roland Luinaud, Moissy-Cramayel (FR); Alain Decocq, Moissy-Cramayel (FR); Christophe Guengant, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 15/578,204

(22) PCT Filed: Jun. 29, 2016

(86) PCT No.: PCT/FR2016/051622
§ 371 (c)(1),
(2) Date: Nov. 29, 2017

(87) PCT Pub. No.: WO2017/006016
PCT Pub. Date: Jan. 12, 2017

(65) Prior Publication Data
US 2018/0149544 A1    May 31, 2018

(30) Foreign Application Priority Data
Jul. 6, 2015   (FR) ...................... 15 56355

(51) Int. Cl.
*G01M 1/04* (2006.01)
*G01M 1/02* (2006.01)
*G01M 1/06* (2006.01)

(52) U.S. Cl.
CPC ............... *G01M 1/04* (2013.01); *G01M 1/02* (2013.01); *G01M 1/06* (2013.01)

(58) Field of Classification Search
None
See application file for complete search history.

(56) References Cited

U.S. PATENT DOCUMENTS 3,213,689 A  * 10/1965 Cain ....................... G01M 1/20
                                                    73/462
4,750,361 A  *  6/1988 Bandhopadhyay ..... G01M 1/16
                                                    73/462

(Continued)

FOREIGN PATENT DOCUMENTS

| DE | 101 16 689 A1 | 10/2002 |
| WO | 2011/070100 A1 | 6/2011 |

OTHER PUBLICATIONS

International Search Report dated Sep. 26, 2016, for International Application No. PCT/FR2016/051622, filed Jun. 29, 2016, 7 pages.

(Continued)

*Primary Examiner* — Paul West
*Assistant Examiner* — Mark A Shabman
(74) *Attorney, Agent, or Firm* — Christensen O'Connor Johnson Kindness PLLC (57) ABSTRACT

A calibration rotor for a horizontal balancer, configured to be driven by a driver. The calibration rotor includes a main barrel that has a longitudinal axis and the periphery of which includes points for attaching balance weights that are evenly distributed in an axial and angular manner about the axis. A rotation guide is arranged at each end of the main barrel. The rotor is modular, and the rotation guide includes adapters (40, 42) which are capable of being configured to be attached to the ends of the barrel. The guide is of a first type, suitable for rotatably guiding the barrel on rollers, or of a second type, suitable for rotatably guiding the half-shell barrel. Each type of adapter has the same predetermined moment of inertia and is interchangeable on the barrel.

10 Claims, 6 Drawing Sheets

(56) References Cited

U.S. PATENT DOCUMENTS

| | | | | |
|---|---|---|---|---|
| 5,033,302 A | * | 7/1991 | Monch | G01M 1/04 |
| | | | | 73/460 |
| 5,240,358 A | * | 8/1993 | Hackett | B23Q 11/0035 |
| | | | | 409/141 |
| 9,200,977 B2 | | 12/2015 | Casadio et al. | |
| 9,816,899 B2 | * | 11/2017 | Braghiroli | H04W 4/70 |
| 2006/0266115 A1 | | 11/2006 | Feldmann et al. | |
| 2011/0270564 A1 | * | 11/2011 | Feero | G01L 25/00 |
| | | | | 702/104 |

OTHER PUBLICATIONS

Written Opinion dated Sep. 26, 2016, for International Application No. PCT/FR2016/051622, filed Jun. 29, 2016, 6 pages.
Bloch, H. et al., "Machinery Component Maintenance and Repair; Chapter 6: Balancing of Machinery Components," Jan. 1, 2005, pp. 258-350, ISBN: 978-0/7506-7726-4.

* cited by examiner

MODULAR CALIBRATION ROTOR FOR A HORIZONTAL BALANCER

The invention relates to a modular calibration rotor for calibrating a horizontal balancing machine, in particular a rotor for calibrating different types of balancing machines of the kind used in the field of aeronautic power for the purpose of balancing turbine engine rotors.

PRIOR ART

A turbine engine comprises rotors which are either in a single piece, or consist, more typically, of a plurality of elements produced separately and assembled mechanically. A gas turbine engine therefore comprises one or more rotor assemblies each consisting of a compressor and a turbine. To provide a certain degree of flexibility in the maintenance of the engines, the assemblies are made up of interchangeable modules. In the case of a rotor of a gas turbine engine, a compressor module is connected to a turbine module. During repair, for example, the compressor module or turbine module of the rotor can therefore be replaced with another module.

Balancing a single-piece rotor of great length, or balancing rotor modules separately, requires that the balancing machine have a high level of precision. It is therefore important to regularly calibrate the balancing machine in order to prevent any measuring errors which would result in an imbalance of the rotors.

Conventionally, in order to calibrate a balancing machine, a calibration rotor is used that is adapted to the particular type of balancing machine to be calibrated.

For this purpose, standard rotors can be used, such as described in DE-101.16.689-A1.

A calibration rotor can also be modular, i.e. it can essentially comprise an orientation barrel of which the periphery comprises points for attaching balance weights which are evenly distributed in an axial and angular manner around the longitudinal axis of the calibration rotor. Attachment points of this kind consist, for example, of tappings intended for receiving attachment screws which pass through the weights which have to be attached to the barrel. The screws are calibrated and the known weight thereof is treated as an integral part of the balance weight in the balancing process. A rotor of this type is disclosed in Heinz Bloch et al, "Machinery component maintenance and repair", chapter 6, 1 Jan. 2005, ISBN 978-0-75067726-4.

Calibration rotors currently have different configurations which are each adapted for a particular type of balancing machine.

In particular, there are two types of calibration rotors which are each intended for a particular mode of rotatable mounting. In particular, there is one type of calibration rotor, provided for guiding on rollers, in which each end of the rotor comprises a raceway intended for rolling on a pair of rollers having axes that are parallel to the axis of the calibration rotor. There is also another type of calibration rotor, provided for rotatably mounting in a "half-shell", in which each end of the rotor comprises a groove intended for receiving an inner race of a roller bearing. In this latter case, an outer race of the roller bearing is immobilised between a half-shell or cap and a flange, which are rigidly connected to a frame of the balancing machine. Finally, there are calibration rotors which combine these two solutions.

There are two types of calibration rotors which are each intended for a particular driving mode. In particular, there is one type of calibration rotor intended for driving by means of a universal joint at the end of the rotor, and another type of rotor intended for driving by means of a belt, the calibration rotor comprising at least one groove which is arranged in an intermediate part and which is intended for receiving a belt for driving the balancing machine.

Finally, there are calibration rotors which only extend between the two bearings thereof, and calibration rotors comprising at least one portion which extends beyond one of the bearings in a cantilevered manner.

The abundance of types of calibration rotor in a balancing workshop having balancing machines of different types means that a specific calibration rotor is thus provided for each type of balancing machine, thereby being is particularly constraining in terms of storage, the calibration rotors being particularly large components.

Therefore, there is a real need for simplifying the stock of calibration rotors that are available in a balancing workshop.

In order to satisfy this need, a first solution consists in reducing the number of different types of balancing machines used. This solution cannot be contemplated since the balancing machines are intended for balancing different types of rotors and the number thereof cannot be reduced.

A second solution, which is the object of the present invention, consists in providing a modular calibration rotor capable of being adapted to different types of balancing machines.

Providing adapters for coupling rotors to a balancing machine is known, as has been described in WO-2011/070100-A1, for example. However, such adapters are only used for coupling and not for guiding.

Moreover, guiding the rotor at anything but the ends thereof is an inconceivable proposal since the guiding means must not interfere with the periphery of the rotor which has to receive the balance weights. Thus, a universal solution but provided in an intermediate part of the rotor, such as the fluid bearings described in US-2006/266115-A1, is not conceivable.

SUMMARY OF THE INVENTION

In order to simplify the stock of calibration rotors that are available in a balancing workshop, the invention provides a calibration rotor for a horizontal balancing machine, said rotor being designed for being driven by means for driving said balancing machine, and comprising at least:

a main barrel which has a longitudinal axis A and of which the periphery comprises points for attaching balance weights which are evenly distributed in an axial and angular manner around said axis A, and means for rotatably guiding said main barrel, which means are arranged at each end of said main barrel.

According to the invention, the rotor is modular and said guide means comprise adapters suitable for being attached to ends of the barrel, each adapter being of a first type for rotatably guiding the barrel on rollers, or of a second type for rotatably guiding the barrel in a half-shell, and each type of adapter having the same predetermined moment of inertia and being able to be interchangeably attached to the barrel.

According to other features of the invention:

the calibration rotor comprises a secondary tubular barrel which has a longitudinal axis B and of which the periphery comprises points for attaching balance weights which are evenly distributed in an axial and angular manner around said axis B, and which secondary barrel is suitable for being attached in a cantilevered manner to an end of at least one adapter such that the longitudinal axes A and B are aligned, the adapter of the first type comprises a single-piece tubular element comprising at least one first end collar suitable for being attached to a complementary end surface of the main barrel, an intermediate portion comprising a raceway designed to engage with rollers of the balancing machine, and a second end collar which is capable of selectively receiving a corresponding collar of said secondary barrel, the guide adapter of the second type comprises first and second coaxial tubular elements which are suitable for being fitted and attached one inside the other, comprise a first end collar suitable for being attached to a complementary end collar of the main barrel and a second end collar which is capable of selectively receiving a corresponding collar of said secondary barrel, respectively, and define at the junction therebetween an annular groove for receiving and axially immobilising an inner race of a roller bearing for guiding in a half-shell, said roller bearing comprising an outer race which is immobilised between a half-shell and a flange of the balancing machine, the first tubular element comprises, at an end opposite the end collar thereof, a frustoconical outer bearing surface designed for being received in a frustoconical inner bearing surface of the second tubular element, a cylindrical bearing surface adjacent to said frustoconical bearing surface, and a tubular portion which is adjacent to the cylindrical bearing surface and has a larger diameter than said cylindrical bearing surface, said cylindrical bearing surface defining the groove between said tubular portion and the second tubular element, and the first and second coaxial tubular elements are attached to one another by means of screws which pass axially through one of said tubular elements, which are received in the other tubular element, and the tightening of which allows said inner race of the roller bearing to be locked in the groove, each adapter comprises a frustoconical annular bearing surface for centring purposes which extends axially from each of the end collars thereof, and which is suitable for engaging with a complementary and corresponding frustoconical inner bearing surface of the main barrel or secondary barrel, the calibration rotor comprises means designed for engaging with means for driving by means of a belt or means for driving by means of a universal joint of the balancing machine, the means designed for engaging with the means for driving by means of a belt comprise at least one bearing surface which is formed on the periphery of the main barrel, is arranged in particular in an intermediate part of said main barrel, and is suitable for receiving a belt for driving the balancing machine, the means designed for engaging with the means for driving by means of a universal joint of the balancing machine comprise:
  the second end collar of the guide adapter, which is designed so as to be complementary to a coupling collar of the universal joint, and
  means for attaching, in particular by bolting, which are arranged between said second end collar and said coupling collar, the calibration rotor comprises a stop end piece which is designed to be attached to a free end of at least one of the adapters and/or of the secondary barrel so as to limit the axial movements of the rotor during operation.

DESCRIPTION OF THE FIGURES

The invention will be better understood, and other aims, details, features and advantages thereof will become clearer throughout the following detailed explanatory description of an embodiment of the invention given by way of purely illustrative and non-limiting example, with reference to the accompanying schematic drawings, in which.

DETAILED DESCRIPTION OF AN EMBODIMENT OF THE INVENTION

Figure 1:
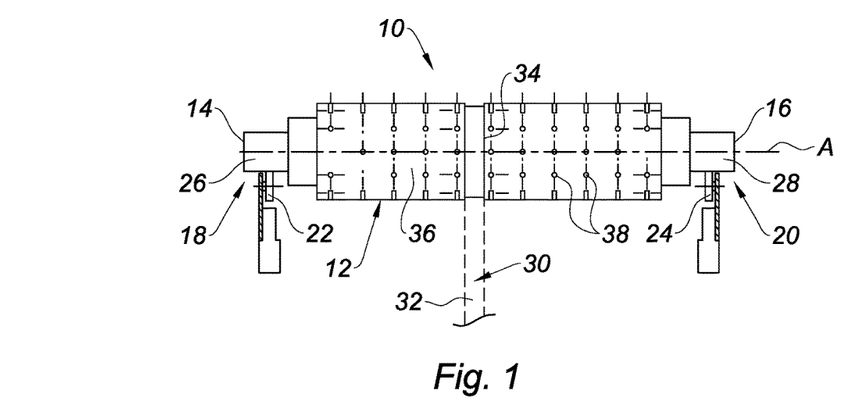
FIG. 1 is a schematic view in a transverse direction of a calibration rotor according to the prior art, which is driven by a universal joint and mounted on rollers.

FIG. 1 shows a calibration rotor 10 for a horizontal balancing machine produced according to the prior art.

In a manner known from the prior art, the calibration rotor 10 is a single-piece rotor which has a longitudinal axis A and comprises a barrel 12 which is supported on the two opposite ends 14 and 16 thereof by two guide means 18 and 20, respectively. In the present case, the guide means 18 and 20 are cylindrical end bearing surfaces 26, 28 of the barrel 12 which are supported by bearings of the balancing machine that have rollers 22, 24. The barrel 10 is also capable of being rotated by drive means 30 comprising a belt 32, indicated by dashed lines, which is received in an intermediate groove 34 formed in the periphery 36 of the barrel 12. The periphery 36 of the barrel 12 also comprises attachment points 38, in particular tappings, which are evenly distributed in an axial and angular manner around the axis A and are intended for allowing weights (not shown) to be attached to the surface of the barrel 12.

As noted above, such a rotor 10 is intended for only allowing a predetermined type of balancing machine to be balanced, which balancing machine comprising bearings having rollers 22, 24 and a drive which drives by means of a belt 32.

Indeed, in a variant, there are balancing machines comprising drives which drive by means of a belt, balancing machines comprising bearings rotatably mounted in a half-shell and barrels arranged on the bearings in a cantilevered manner.

The use of such a rotor 10 is therefore limited and said rotor cannot be used on a different type of balancing machine.

The abundance of types of rotor in a balancing workshop having balancing machines of different types means that a specific calibration rotor 10 is thus provided for each type of balancing machine, thereby being particularly constraining in terms of storage, the calibration rotors being particularly large components.

Therefore, there is a real need for simplifying the stock of calibration rotors that are available in said balancing workshop.

In order to remedy the drawback of there being an abundance of existing rotors, the invention provides a modular calibration rotor 10 which can be adapted to different types of balancing machines and which allows to provide different overall configurations for the barrel.

For this purpose, as shown in FIGS. 11 to 20, the invention provides a calibration rotor 10 for a horizontal balancing machine, which is designed to be driven by drive means 30 and comprises, in a known manner, at least one main barrel 12 which has a longitudinal axis A and of which the periphery 36 comprises points 38 for attaching balance weights which are evenly distributed in an axial and angular manner around said axis A, and means 18, 20 for rotatably guiding said main barrel that are arranged at each end 14, 16 of said main barrel 12.

According to the invention, the rotor 12 is modular, and each guide means 16, 18 comprises adapters 40, 42 suitable for being attached to opposite ends 14, 16 of the barrel.

Figures 2, 3:
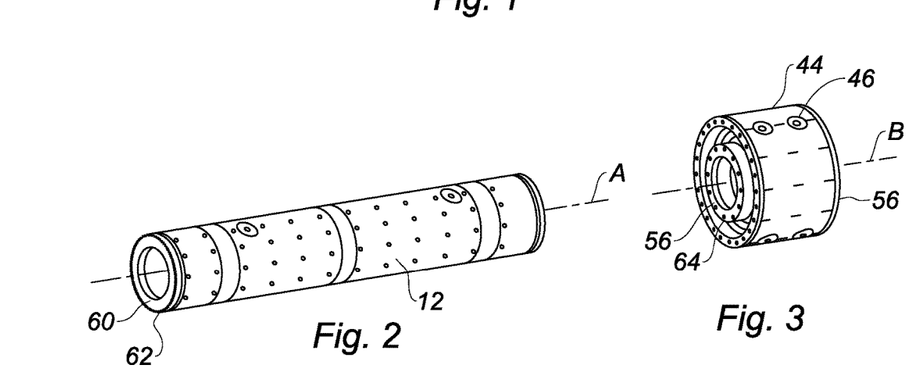
FIG. 2 is a perspective view of a main barrel for a calibration rotor according to the invention.
FIG. 3 is a perspective view of a secondary barrel for a calibration rotor according to the invention.
Figure 4:
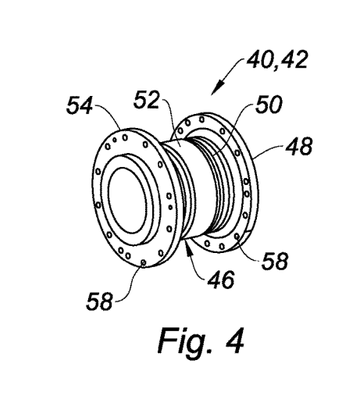
FIG. 4 is a perspective view of an adapter of a first type for a calibration rotor according to the invention.
Figure 5:
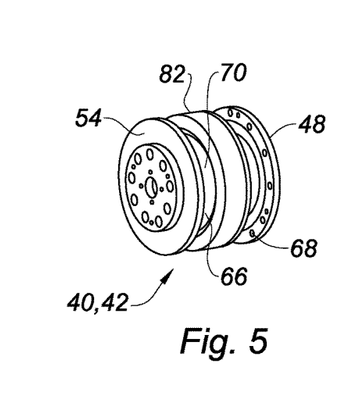
FIG. 5 is a perspective view of an adapter of a second type for a calibration rotor according to the invention, which is provided with the roller bearing thereof.
Figure 6:
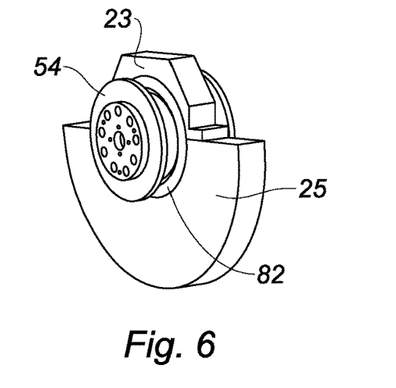
FIG. 6 is a perspective view of the adapter from FIG. 5, mounted in a half-shell.
Figure 10:
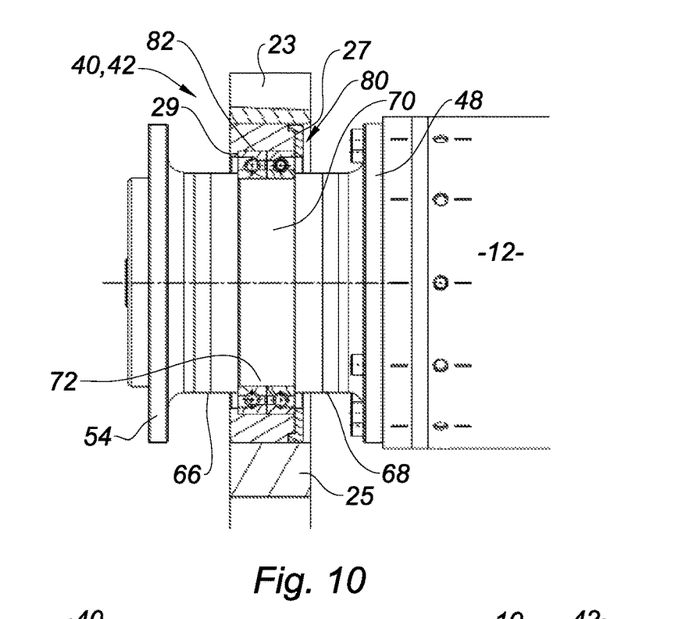
FIG. 10 is an axial cross section through the adapter from FIG. 5, mounted in a half-shell.

Advantageously, as shown in FIGS. 3 and 4, the adapter 40, 42 can be of a first type for rotatably guiding the barrel 12 on the rollers 22, 24. In a variant, as shown in FIGS. 5, 6 and 10, said adapter can be of a second type for rotatably guiding the barrel 12 in a half-shell 23, i.e. the adapter is mounted between a flange 25 of the balancing machine and a half-shell 23 which is connected to said flange 25.

In the two cases, an essential feature is that each type of adapter 40, 42 has the same predetermined moment of inertia, which is exactly the same for each type, and can be interchangeably attached to the barrel. The detail of the adapters 40, 42 and the attachment thereof will be explained in more detail in the present description.

Therefore, the overall moment of inertia of the barrel 12 is unchanged, regardless of whether guiding is carried out by rolling on the rollers 22, 24 or in a half-shell 23 attached to a flange 25 which is rigidly connected to a frame of the balancing machine.

Figure 11:
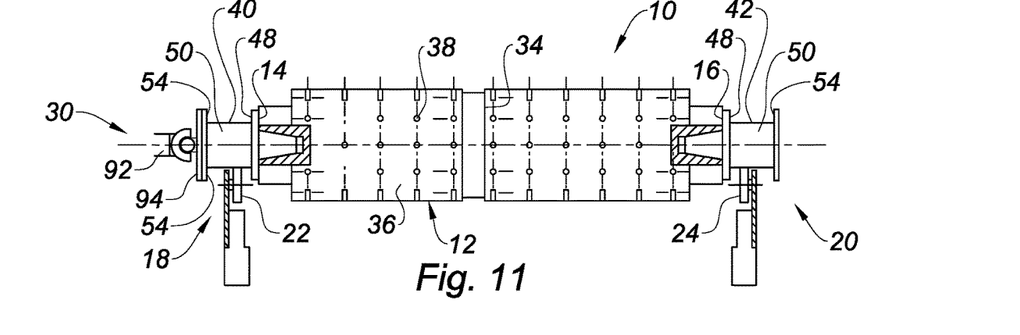
FIG. 11 is a schematic view in a transverse direction of a calibration rotor according to the invention, which is driven by a universal joint and mounted on rollers.
Figure 12:
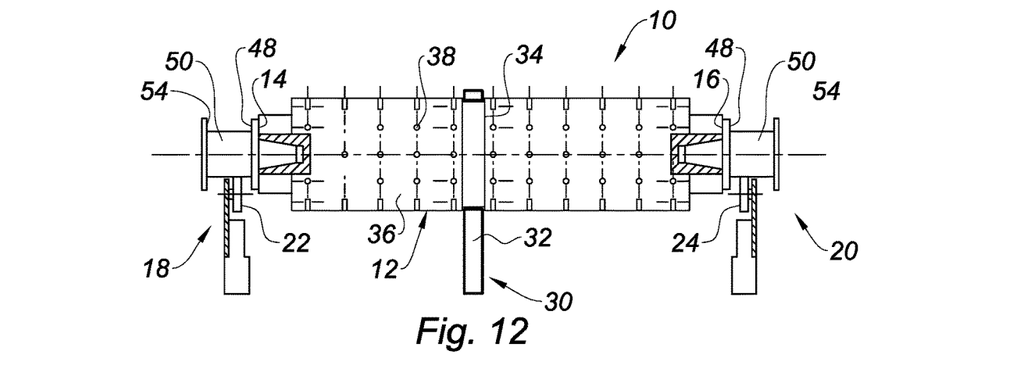
FIG. 12 is a schematic view in a transverse direction of a calibration rotor according to the invention, which is driven by a belt and mounted on rollers.
Figure 13:
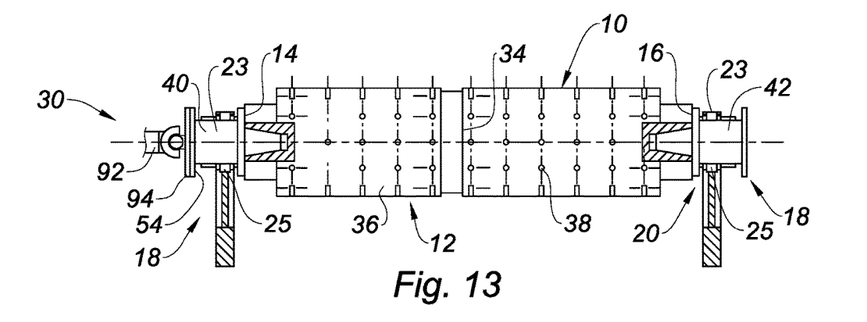
FIG. 13 is a schematic view in a transverse direction of a calibration rotor according to the invention, comprising a main barrel driven by a universal joint and rotatably mounted in a half-shell.
Figure 14:
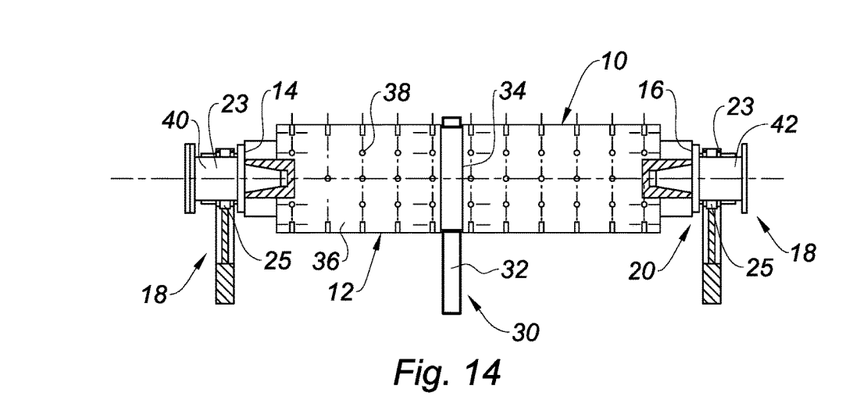
FIG. 14 is a schematic view in a transverse direction of a calibration rotor according to the invention, comprising a main barrel driven by a belt and rotatably mounted in a half-shell.
Figure 15:
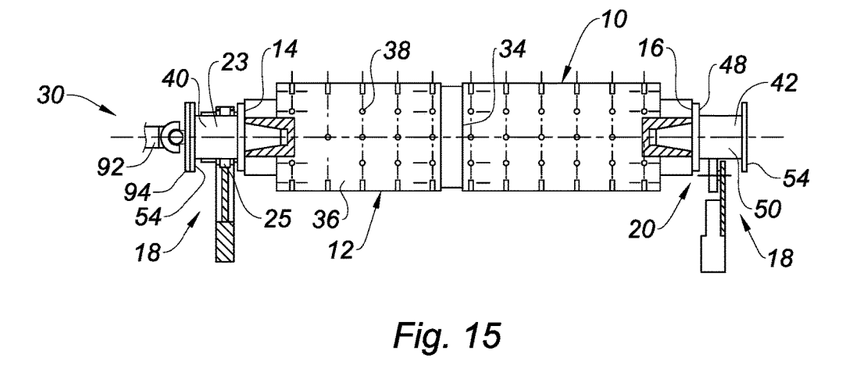
FIG. 15 is a schematic view in a transverse direction of a calibration rotor according to the invention, comprising a main barrel driven by a universal joint and mounted on a half-shell and rollers.
Figure 16:
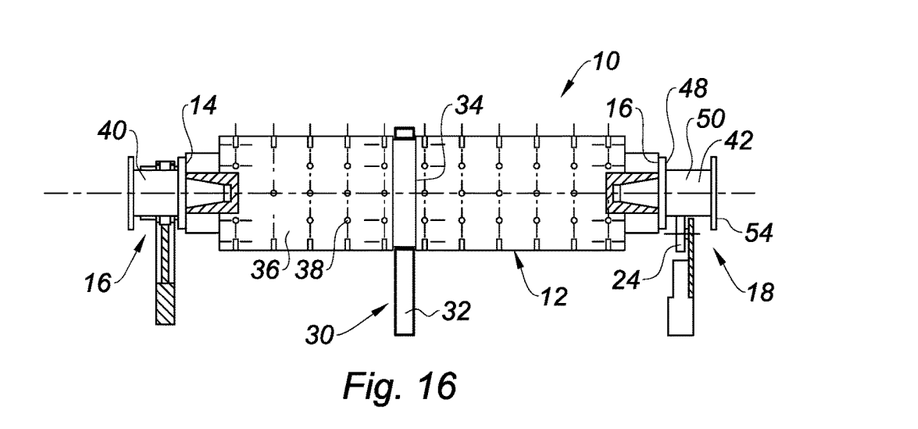
FIG. 16 is a schematic view in a transverse direction of a calibration rotor according to the invention comprising a main barrel driven by a belt and mounted on a half-shell and rollers.
Figure 17:
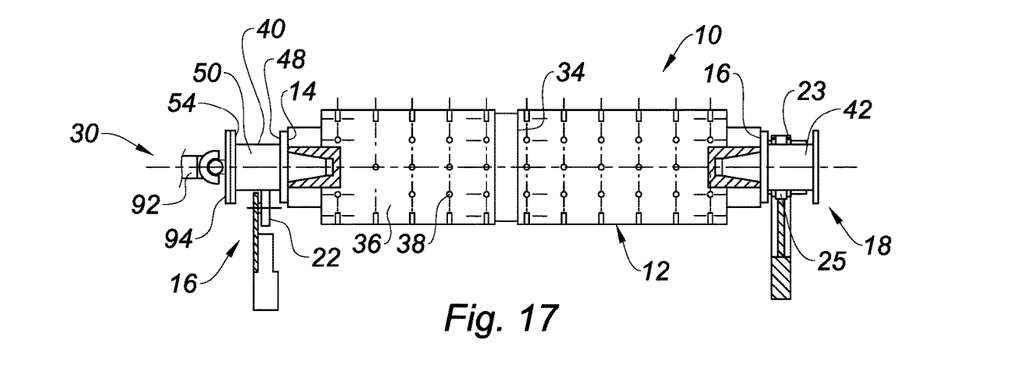
FIG. 17 is a schematic view in a transverse direction of a calibration rotor according to a variant of the invention, comprising a main barrel driven by a universal joint and mounted on rollers and a half-shell.
Figure 18:
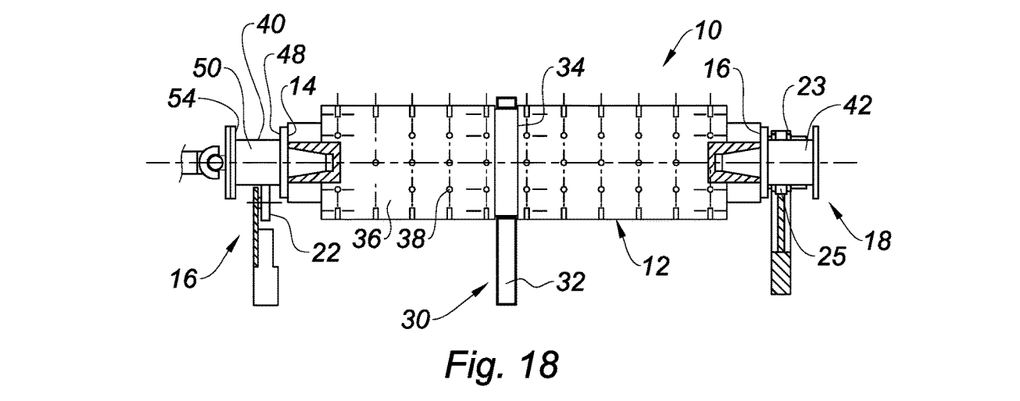
FIG. 18 is a schematic view in a transverse direction of a calibration rotor according to a variant of the invention, comprising a main barrel driven by a belt and mounted on rollers and a half-shell.
Figure 19:
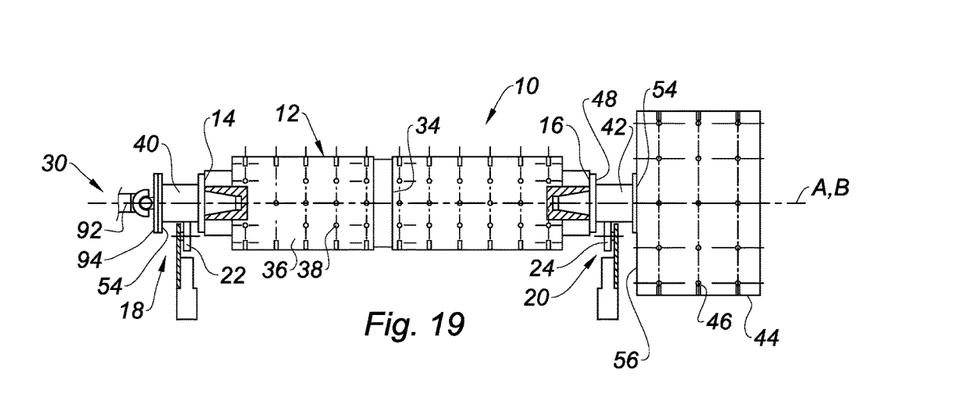
FIG. 19 is a schematic view in a transverse direction of a calibration rotor according to the invention, comprising a main barrel which is driven by a universal joint and mounted on rollers, and comprising a cantilevered secondary barrel.
Figure 20:
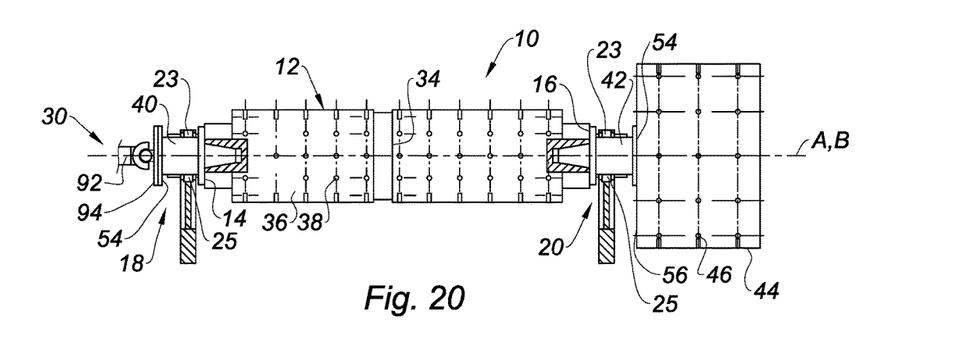
FIG. 20 is a schematic view in a transverse direction of a calibration rotor according to the invention, comprising a main barrel which is driven by a universal joint and rotatably mounted in a half-shell, and comprising a cantilevered secondary barrel.

As shown in FIGS. 10 to 20, several configurations are possible. For example, the barrel 12 can comprise adapters 40, 42 at the two ends 14, 16 thereof for guiding on rollers 22, 24, as shown in FIGS. 11, 12 and 19. The barrel 12 can comprise adapters 40, 42 at the two ends 14, 16 thereof for guiding in a half-shell 23, as shown in FIGS. 13, 14 and 20. A mixed form of guiding involving an adapter 40 at the end 14 for guiding on rollers 22 and an adapter 42 at the end 16 for guiding in a half-shell 23 is also conceivable, as shown in FIGS. 17 and 18. Inversely, a mixed form of guiding involving an adapter 40 at the end 14 for guiding in a half-shell 23 and an adapter 42 at the end 16 for guiding on rollers 22 is also conceivable, as shown in FIG. 16.

Advantageously, as shown in FIG. 3 and FIGS. 19 and 20, the calibration rotor 12 can comprise a secondary tubular barrel 44 which has a longitudinal axis B and the periphery of which comprises points 46 for attaching balance weights which are evenly distributed in an axial and angular manner around said axis B. As shown in FIGS. 19 and 20, the secondary barrel 44 is suitable for being attached in a cantilevered manner to an end of at least one adapter 42 such that the longitudinal axes A and B are aligned. The detail of the attachment of the secondary barrel 44 will be explained in more detail in the present description.

The secondary barrel 44 advantageously makes it possible to replicate the configuration of a rotor comprising a part which is cantilevered in relation to the bearings 18, 20.

So as to allow them to roll on the rollers 22 or 24, each adapter 40, 42 of the first type, as shown in FIG. 4 and FIGS. 11, 12 and 19, comprises a single-piece tubular element 46 comprising at least one first end collar 48 suitable for being attached to a complementary end surface 16 of the main barrel 12, an intermediate portion 50 comprising a raceway 52 designed to engage with rollers 22, 24 of the balancing machine, and a second end collar 54. The collar 54 is capable of remaining free, as shown in FIG. 11 or 12, or of selectively receiving a corresponding collar 56 of the secondary barrel 44 suitable for being mounted in a cantilevered manner on said collar 54.

Preferably, each adapter 40, 42 is symmetrical with respect to an axial midplane, and the collars 48, 54 thereof are identical such that it is not necessary to consider the orientation of the adapter 40, 42 before it is mounted.

Each collar 48, 54 comprises, as shown in FIG. 4, a series of holes 58 which are distributed in an angular manner on the periphery thereof and which are intended for being aligned with similar holes 60 in a corresponding end surface 62 of the barrel 12 so as to allow the adapter 40, 42 to be attached to the barrel 12. Similarly, the holes 58 can be aligned with similar holes 64 in the corresponding end collar 56 of the secondary barrel 44 so as to allow said secondary barrel 44 to be attached to the adapter 40, 42.

Figure 8:
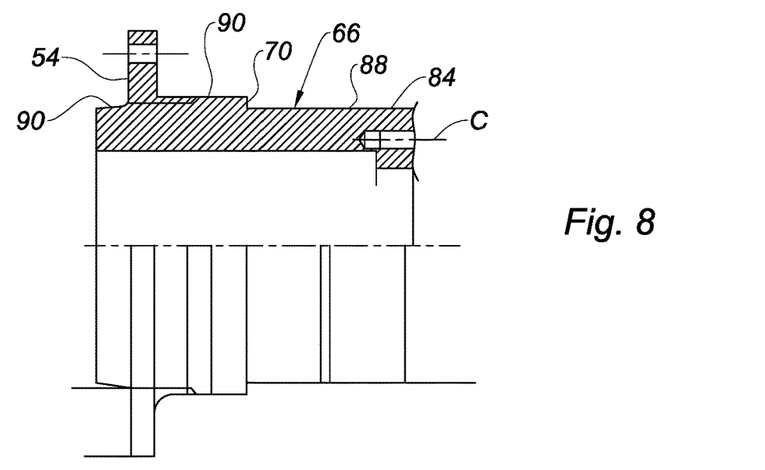
FIGS. 8 and 9 are axial cross sections through the first and second tubular elements of the adapter from FIG. 5.
Figure 9:
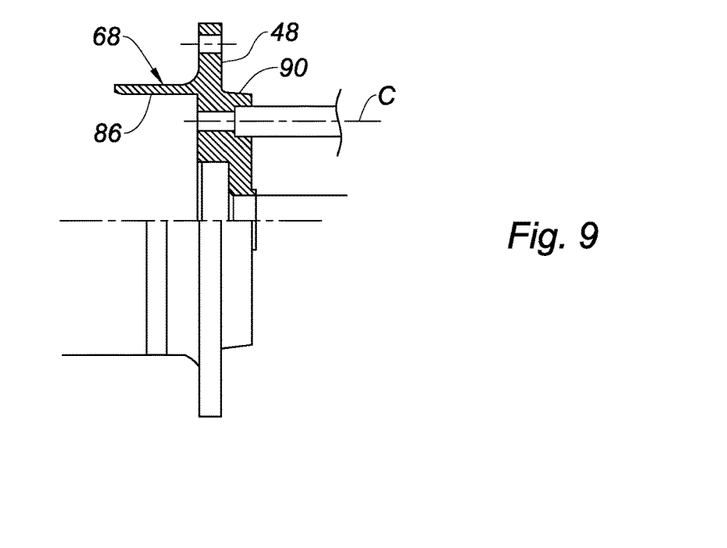

So as to allow it to roll in the half-shell 23 and in the associated flange 25, each guide adapter 40, 42 of the second type comprises, as shown in FIGS. 8 to 10, first and second coaxial tubular elements 66, 68 capable of being fitted and attached to one another. In the same way as for the previous adapter, these elements 66, 68 comprise a first end collar 48 suitable for being attached to a complementary end collar 62 of the main barrel 12, and a second end collar 54 which is capable of remaining free, as shown in FIGS. 13 and 14, or of selectively receiving a corresponding collar 56 of said secondary barrel 44, respectively. The elements 66, 68 also define at the junction therebetween an annular groove 70 for receiving and axially immobilising an inner race 72 of a roller bearing 80 for guiding in a half-shell. As shown in FIG. 10, said roller bearing 80 comprises an outer race 82 which is immobilised between the half-shell 23 and the flange 25 of the balancing machine.

As shown more specifically in FIGS. 8 and 9, the first tubular element 66 comprises, at an end opposite the end collar 54 thereof, a frustoconical outer bearing surface 84 designed for being received in a frustoconical inner bearing surface 86 of the second tubular element 68, a cylindrical bearing surface 88 adjacent to said frustoconical bearing surface 84 and intended for defining the groove 70, and a tubular portion 90 which is adjacent to the cylindrical bearing surface 88 and which has a larger diameter than said cylindrical bearing surface 88. The cylindrical bearing portion 88 therefore defines the groove 70 between said tubular portion 88 and the second tubular element 68.

The first and second coaxial tubular elements 66 and 68 are intended for being attached to one another by means of screws (not shown) having an axis C, which pass axially through one of said tubular elements, in this case the second tubular element 68, and which are received in the other tubular element, i.e. the first tubular element 66. Tightening these screws makes it possible to lock the inner race 72 of the roller bearing 80 in the groove 70.

FIG. 10 also shows the attachment of the roller bearing 80 in the half-shell 23 and in the flange 25. The roller bearing 80 comprises two rows of angular contact balls for which the outer race is axially immobilised in the half-shell 23 and in the flange 25 by a shoulder 29 at one end and by a resilient ring 27 at the other end; however, it will be understood that this configuration does not have a limiting effect on the invention.

In the preferred embodiment of the invention, as shown in FIGS. 8 and 9 for example, each adapter 40, 42 comprises a frustoconical annular bearing surface 90 for centring purposes which extends axially from each of the end collars 50, 54 thereof, and which is suitable for engaging with a complementary and corresponding frustoconical inner bearing surface (not shown) of the main barrel 12 or secondary barrel 44.

The frustoconical bearing surface 90 has been shown in the context of the second type of adapter 40, 42; however, it will be understood that a similar bearing surface 90 is provided for the first type of adapter 40, 42.

Another essential feature of the calibration rotor 10 according to the invention is that it comprises means designed for engaging with means for driving by means of a belt 32 or means for driving by means of a universal joint 92 of the balancing machine.

Therefore, the rotor 10 can be rotated in two different ways. As shown in FIG. 1 and FIGS. 11 to 20, the means designed for engaging with the means 30 for driving by means of a belt 32 comprise at least one groove 34 which is formed on the periphery of the main barrel 12, which is arranged in particular in an intermediate part of said main barrel, and which is suitable for receiving a belt 32 for driving the balancing machine. This groove 34 is used to drive the rotors 10 in the case of the rotors shown in FIGS. 12, 14, 16 and 18.

Moreover, the means designed to engage with means 30 for driving by means of a universal joint 92 of the balancing machine comprise the second end collar 54 of the guide adapter 40, which is designed to be complementary to a coupling collar 94 of the universal joint 92, and means (not shown) for attaching, in particular by bolting, which are arranged between said second end collar 54 and said coupling collar 94. This configuration is shown in FIGS. 10-11, 13, 15, 17, 19 and 20.

Therefore, it will be understood that the rotor 10 can be driven by the belt 34 or the universal joint 92 alike, and that the rotor 10 can thus be adapted to different types of balancing machines.

Finally, it should be noted that the calibration rotor 10 is capable of being stopped by abutment, in particular when being rotatably mounted on the rollers 22, 24. For this purpose, the rotor 10 can comprise, as shown in FIG. 7, a stop end piece 96 which is designed to be attached to a free end of at least one of the adapters 40, 42 and/or of the secondary barrel 44 so as to limit the axial movements of the rotor 10 during operation.

Figure 7:
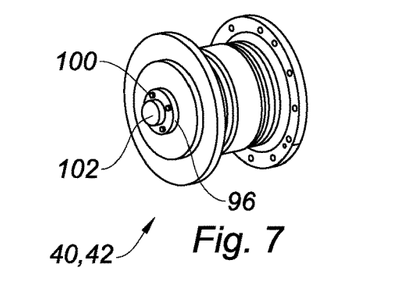
FIG. 7 is a perspective view of the adapter from FIG. 5, provided with a stop.

FIG. 7 shows an example of an embodiment of this type. An adapter 40, 42 receives, at the end of the collar 54 thereof, a disc-shaped element 96 which is attached to the collar by means of screws 100 and which comprises an abutment contact point 102 in the form of a lug which is suitable for axially stopping the rotor 10 by abutting an element (not shown) that is rigidly connected to the frame of the balancing machine.

The invention therefore makes it possible to provide a calibration rotor 10 suitable for replicating the configurations of a real rotor 10 and capable of being used to calibrate balancing machines of different types, thereby allowing to significantly reduce the stock of calibration rotors used in a balancing workshop.

The invention claimed is:

1. A calibration rotor for a horizontal balancing machine, said rotor being configured to be driven by a driver, and comprising at least:
   a main barrel having a longitudinal axis A and of which the periphery comprises points configured to attach balance weights, said points being evenly distributed in an axial manner along said axis A and in an angular manner around said axis A, and
   one or more guides configured to rotatably guide said main barrel, the one or more guides being arranged at each end of said main barrel,
   wherein the rotor is modular, and wherein the one or more guides comprise adapters configured to be attached to ends of the barrel, each adapter being one of: a first type for rotatably guiding the barrel on rollers, and a second type for rotatably guiding the barrel in a half-shell, and each first or second type of adapter having respectively the same predetermined moment of inertia than the second or first type of adapter, and each adapter of the first or second type being able to be respectively attached to the barrel instead of an adapter of the second or first type.

2. The calibration rotor according to claim 1, further comprising a secondary tubular barrel having a longitudinal axis B and of which the periphery comprises points configured to attach balance weights, said points being evenly distributed in an axial manner along said axis B and in an angular manner around said axis B, and which secondary barrel is configured to be attached in a cantilevered manner to an end of at least one adapter such that the longitudinal axes A and B are aligned.

3. The calibration rotor according to claim 2, wherein the adapter of the first type comprises a single-piece tubular element comprising at least one first end collar configured to be attached to a complementary end surface of the main barrel, an intermediate portion comprising a raceway configured to engage with rollers of the balancing machine, and a second end collar configured to selectively receive a corresponding collar of said secondary barrel.

4. The calibration rotor according to claim 3, wherein each adapter comprises a frustoconical annular centering bearing surface which extends axially from each of the end collars thereof, and which is configured to engage a complementary and corresponding frustoconical inner bearing surface of the main barrel or secondary barrel.

5. The calibration rotor according to claim 3, further comprising a drive element configured to engage one of a belt and a universal joint, the one of a belt and a universal joint also engaging the driver.

6. The calibration rotor according to claim 5, wherein the drive element is configured to engage the belt, the drive element comprising at least one groove formed on the periphery of the main barrel, which is arranged in an intermediate part of said main barrel, and which is configured to receive the belt to drive the balancing machine.

7. The calibration rotor according to claim 6, wherein the drive element is configured to engage the universal joint, the drive element comprising:
the second end collar of the guide adapter, which is designed so as to be complementary to a coupling collar of the universal joint, and an attachment device, arranged between said second end collar and said coupling collar.

8. The calibration rotor according to claim 2, wherein the guide adapter of the second type comprises first and second coaxial tubular elements configured to be fitted and attached one inside the other, comprise a first end collar configured to be attached to a complementary end collar of the main barrel and a second end collar configured to selectively receive a corresponding collar of said secondary barrel, respectively, and define at the junction therebetween an annular groove for receiving and axially immobilizing an inner race of a roller bearing for guiding in a half-shell, said roller bearing comprising an outer race which is immobilized between a half-shell and a flange of the balancing machine.

9. The calibration rotor according to claim 8, wherein the first tubular element comprises, at an end opposite the end collar thereof, a frustoconical outer bearing surface configured to be received in a frustoconical inner bearing surface of the second tubular element, a cylindrical bearing surface adjacent to said frustoconical bearing surface, and a tubular portion adjacent to the cylindrical bearing surface and which has a larger diameter than said cylindrical bearing surface, said cylindrical bearing surface defining the groove between said tubular portion and the second tubular element, and in that the first and second coaxial tubular elements are attached to one another by means of screws which pass axially through one of said tubular elements, which are received in the other tubular element, and the tightening of which allows said inner race of the roller bearing to be locked in the groove.

10. The calibration rotor according to claim 2, further comprising a stop end piece designed to attach to a free end of at least one of the adapters and/or of the secondary barrel to limit the axial movements of the rotor during operation.

* * * * *